US012778823B2

(12) United States Patent
Lee

(10) Patent No.: US 12,778,823 B2
(45) Date of Patent: Nov. 3, 2026

(54) WHEELCHAIR

(71) Applicant: Passion Mobility Ltd., Taipei City (TW)

(72) Inventor: Chung-Hsin Lee, Las Vegas, NV (US)

(73) Assignee: Passion Mobility Ltd., Taipei City (TW)

( * ) Notice: Subject to any disclaimer, the term of this patent is extended or adjusted under 35 U.S.C. 154(b) by 251 days.

(21) Appl. No.: 18/680,050

(22) Filed: May 31, 2024

(65) Prior Publication Data

US 2025/0367047 A1 Dec. 4, 2025

(51) Int. Cl.
*A61G 5/08* (2006.01)
*A61G 5/04* (2013.01)

(52) U.S. Cl.
CPC ............ *A61G 5/0825* (2016.11); *A61G 5/047* (2013.01); *A61G 2203/12* (2013.01); *A61G 2203/14* (2013.01)

(58) Field of Classification Search
CPC .... A61G 5/0825; A61G 5/047; A61G 5/0875; A61G 2203/12; A61G 5/045
See application file for complete search history.

(56) References Cited

U.S. PATENT DOCUMENTS 4,386,672 A * 6/1983 Coker .................... A61G 5/047
180/907
10,945,900 B1 * 3/2021 Ousborne ............ A61G 5/1005

* cited by examiner

*Primary Examiner* — Marc Q Jimenez
*Assistant Examiner* — James J Triggs
(74) *Attorney, Agent, or Firm* — Best & Flanagan LLP

(57) ABSTRACT

A wheelchair having a seating portion and an underlying support portion, with a storage space formed between the seating portion and the support portion. The support portion extends outwardly relative to the seating portion from a handle portion and defines an operation space. A detachable motor unit is provided for driving the movement of the wheelchair. The storage space transitions between an expanded state and a folded state through adjustment of the seating portion and the support portion.

20 Claims, 3 Drawing Sheets

WHEELCHAIR

FIELD OF INVENTION

A wheelchair, in particular, an improved wheelchair for carrying two persons.

BACKGROUND OF THE INVENTION

With the advancement of civilization, a service personnel is often stationed in a public place to provide convenient services at any time. Especially in airports and railway stations, wheelchairs are often provided for loan or mobility assistance for people with physical or mental disabilities, the elderly, and pregnant women.

However, although the aforementioned services are thoughtful and practical, wheelchairs commonly available in the market often lack storage space design, making it difficult to carry luggage, which may burden the person assisting in pushing the wheelchair when the travel distance is long. Additionally, given the frequency of use and cost requirements, manual wheelchairs that take up storage space when not in use are often chosen for use. Many public places directly use large electric vehicles that can accommodate several people for mobility assistance services. Not only do these electric vehicles take up a lot of space and interfere with pedestrian walkways, but they are also inconvenient for moving up and down stairs.

In view of this, the development of a low-cost wheelchair with storage space that is easy to store and move, and reduces the burden on the assisting person, has become an urgent development goal for the relevant industry to assist in public places.

SUMMARY OF THE INVENTION

In order to develop a low-cost wheelchair with a storage space that is easy to store and move and reduces the burden on the assisting person, the present invention provides a wheelchair comprising a seating portion provided above a support portion; a storage space formed between the seating portion and the support portion; a handle portion connected to one of the seating portion and the support portion. The seating portion comprises at least two seating frames jointly forming a seat surface, and the support portion comprises at least two lower support frames jointly forming a storage surface, the storage surface being spaced from the seat surface to form the storage space. At least two wheels are mounted under each of the at least two lower support frames, and the two lower support frames extend outwardly from the position of the handle portion to form an operation space. At least two folding frames extend and connect between the seating portion and the support portion, the sizes of the seat surface and the storage surface being adjustable by relative displacement between the two folding frames, the two lower support frames, and the two seating frames. The handle portion includes an operation handle extending toward the operation space, and a detachable motor unit is provided on the seating portion, the support portion, and the handle portion, wherein the motor unit includes a control body for receiving a remote control signal from a remote control device and converts the signal into a driving command for a motor device which drives at least one of the wheels in accordance with the remote control signal.

In the expanded state of the wheelchair provided by the present invention, the two lower support frames are configured in parallel with the two seating frames, and the two folding frames are arranged in a crosswise configuration. The relative rotational displacement between the two folding frames changes the relative distance between the two lower support frames and the two seating frames, thereby causing the seating portion and the support portion to move away from each other and transforming the wheelchair into a folded state.

In the expanded state of the wheelchair, a rider can sit on the seat cushion of the seating portion, and an operator can stand on the base plate. In this way, the operator can operate the remote control device to control the movement of the wheelchair. At the same time, the storage space can accommodate luggage of the rider and/or the operator, thereby solving the problem of carrying luggage. Since the structural design of this improved wheelchair is simple, the size of the wheelchair, even in the expanded state, is not much different from that of a normal wheelchair, which facilitates mobility across floors.

In the folded state of the wheelchair, not only is the overall volume greatly reduced, but the detachable design of the motor unit also makes the wheelchair easy to store and facilitates a modular design. If some structures or devices are damaged, only the damaged parts need to be replaced, thereby avoiding material waste.

Furthermore, if only the motor unit is removed from the wheelchair in the expanded state, the wheelchair can still be used as a regular wheelchair, suitable for temporary, short-distance, or quick service, while also avoiding the burden of the weight of the motor unit.

DETAILED DESCRIPTION OF THE PREFERRED EMBODIMENTS

Figure 1:
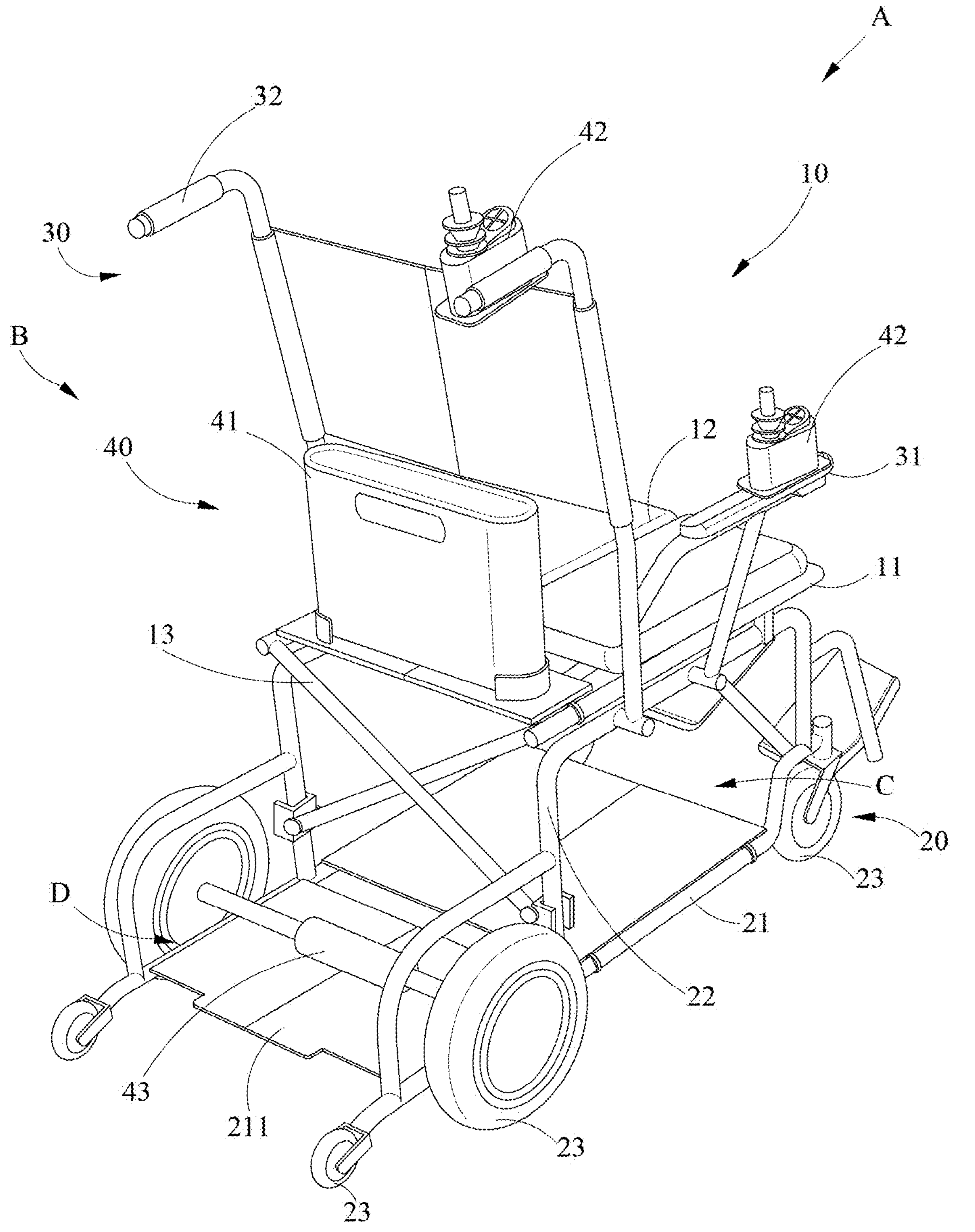
FIG. 1 is a schematic view illustrating a first state of a preferred embodiment of the present invention.
Figure 2:
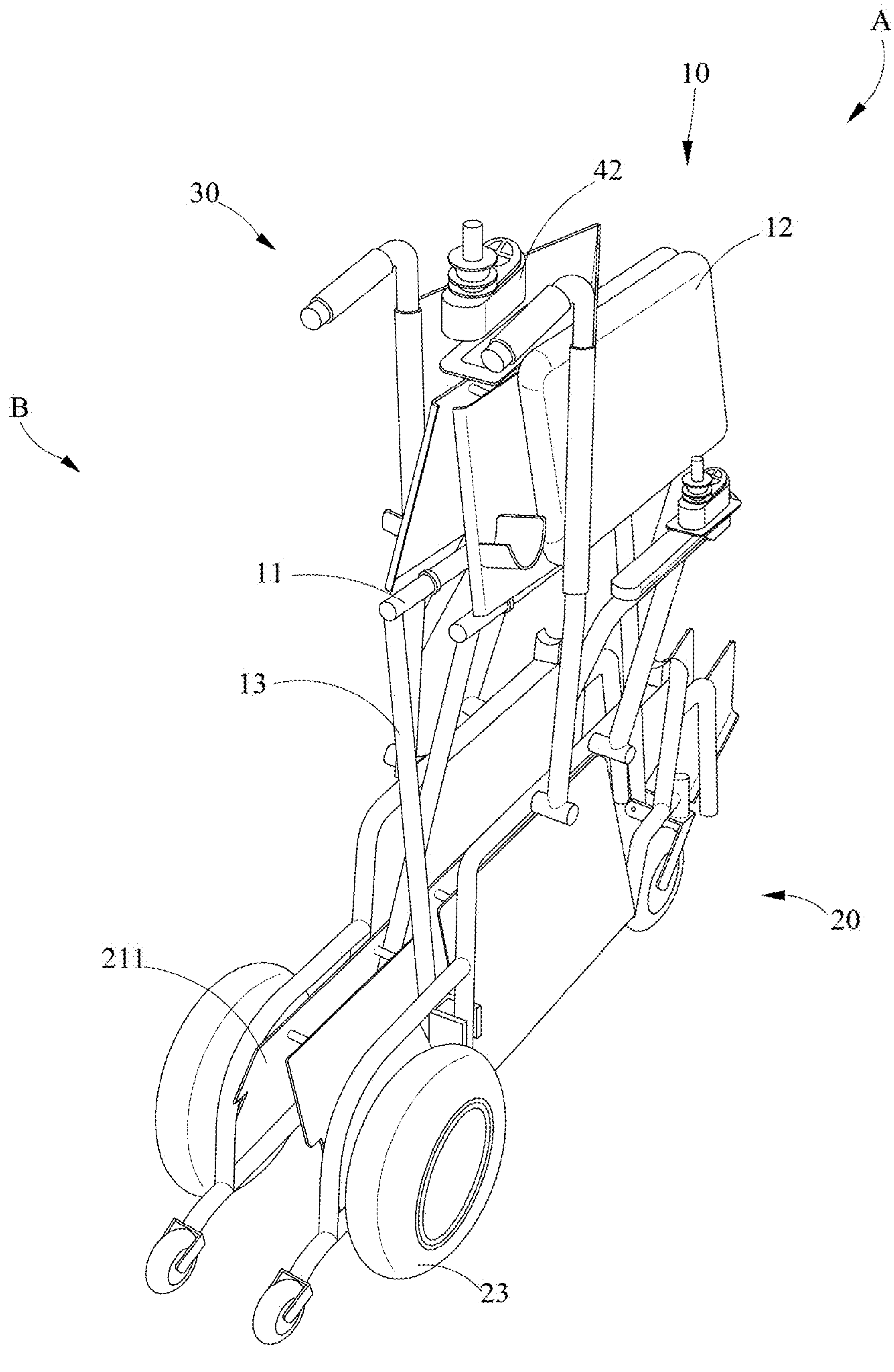
FIG. 2 is a schematic view illustrating a second state of a preferred embodiment of the present invention.

Reference is made to FIGS. 1 and 2, which illustrate an improved wheelchair provided by the present invention that can transition between an expanded state and a folded state, one side being a seating side A and the other side being an operation side B. The wheelchair comprises a seating portion 10, a support portion 20, a handle portion 30, and a motor unit 40. The seating portion 10 is provided above the support portion 20, forming a storage space C between the seating portion 10 and the support portion 20. The handle portion 30 is connected to the seating portion 10 or the support portion 20 on the operation side B, and the support portion 20 extends outwardly from the position of the handle portion 30 toward the operation side B, defining an operation space D.

The seating portion 10 comprises at least two seating frames 11, which jointly form a seat surface for placing a seat cushion 12. At least two folding frames 13 extend between the seating portion 10 and the support portion 20, with one end of the two folding frames 13 connected to the two seating frames 11. The size of the seat surface can be adjusted by the two folding frames 13 and/or a relative displacement between the two folding frames 13.

Wherein, the two folding frames 13 are disposed on the two seating frames 11 on the operation side B.

Preferably, the seat cushion 12 is detachably placed on the seat surface.

In one embodiment, the seat cushion 12 can be folded when the size of the seat surface changes.

In one embodiment, the seat cushion 12 can shrink or expand when the size of the seat surface changes.

The support portion 20 comprises at least two lower support frames 21, which jointly form a storage surface. The storage surface is spaced apart from the seat surface to form the storage space C.

Wherein, the two lower support frames 21 further comprise at least one upper support frame 22 extending in the upward to downward direction within the storage space C, with the at least two upper support frames 22 supporting and maintaining the distance between the storage surface and the seat surface.

Wherein, the other end of the two folding frames 13 is connected to the two lower support frames 21 or the two upper support frames 22, respectively, and the size of the storage surface can be adjusted by relative displacement between the two lower support frames 21, the two upper support frames 22, or the two folding frames 13.

For example, in the expanded state, the two lower support frames 21 are configured in parallel with the two seating frames 11, and the two folding frames 13 are arranged in a crosswise configuration with their other ends connected to the two upper support frames 22. The relative rotational displacement between the two folding frames 13 can change the relative distance between the two lower support frames 21 and the two seating frames 11, causing the seating portion 10 and the support portion 20 to move away from each other, thereby transforming the wheelchair into the folded state.

It is noteworthy that when the two folding frames 13 are relatively rotated and the storage surface and the seat surface become smaller, the vertical distance from top to bottom of the storage space C increases and the horizontal distance from left to right decreases, thereby reducing the volume of the storage space C.

Wherein, one end of the two folding frames 13 can optionally be pivoted and connected to the seating portion 10 or the support portion 20.

Furthermore, one end of the two folding frames 13 can optionally be pivoted to the support portion 20 and be connected to the two lower support frames 21 or the two upper support frames 22.

Conversely, the two lower support frames 21 and the two seating frames 11 can be arranged in a crosswise configuration, and the two folding frames 13 can be configured in a parallel manner to achieve the effect of changing the size of the seat surface. In this case, the extension distance of the storage space C from the seating side A to the operation side B increases and the horizontal distance from left to right decreases, thereby reducing the volume of the storage space C.

At least two wheels 23 are mounted under each of the two lower support frames 21 along the direction from the seating side A to the operation side B, and at least one of the wheels 23 is drivable by the motor unit 40.

Preferably, the two lower support frames 21 extend outwardly toward the operation side B from the position of the handle portion 30, forming the operation space D, and a base plate 211 is disposed between the two lower support frames 21 corresponding to the operation space D. At least one of the wheels 23 is respectively mounted on the two lower support frames 21 corresponding to the position of the operation space D.

Preferably, the base plate 211 can be detachably disposed between the two lower support frames 21.

In one embodiment, the base plate 211 can be folded when the relative distance between the two lower support frames 21 changes.

In one embodiment, the base plate 211 can shrink or expand when the relative distance between the two lower support frames 21 changes.

The handle portion 30 is located between the storage space C and the operation space D, and the handle portion 30 includes a seating handle 31 extending toward the seating portion 10 and an operation handle 32 extending toward the operation space D. At least a portion of the handle portion 30 can be optionally connected to the seating portion 10 or the support portion 20.

Preferably, at least a portion of the handle portion 30 is connected to the support portion 20, preventing the handle portion 30 from moving synchronously with the seating portion 10 when the wheelchair transitions to the folded state as the seating portion 10 moves away from the support portion 20, further causing the height of the wheelchair to increase from top to bottom in the folded state.

Furthermore, two seating handles 31 and two operation handles 32 are arranged symmetrically.

Figure 3:
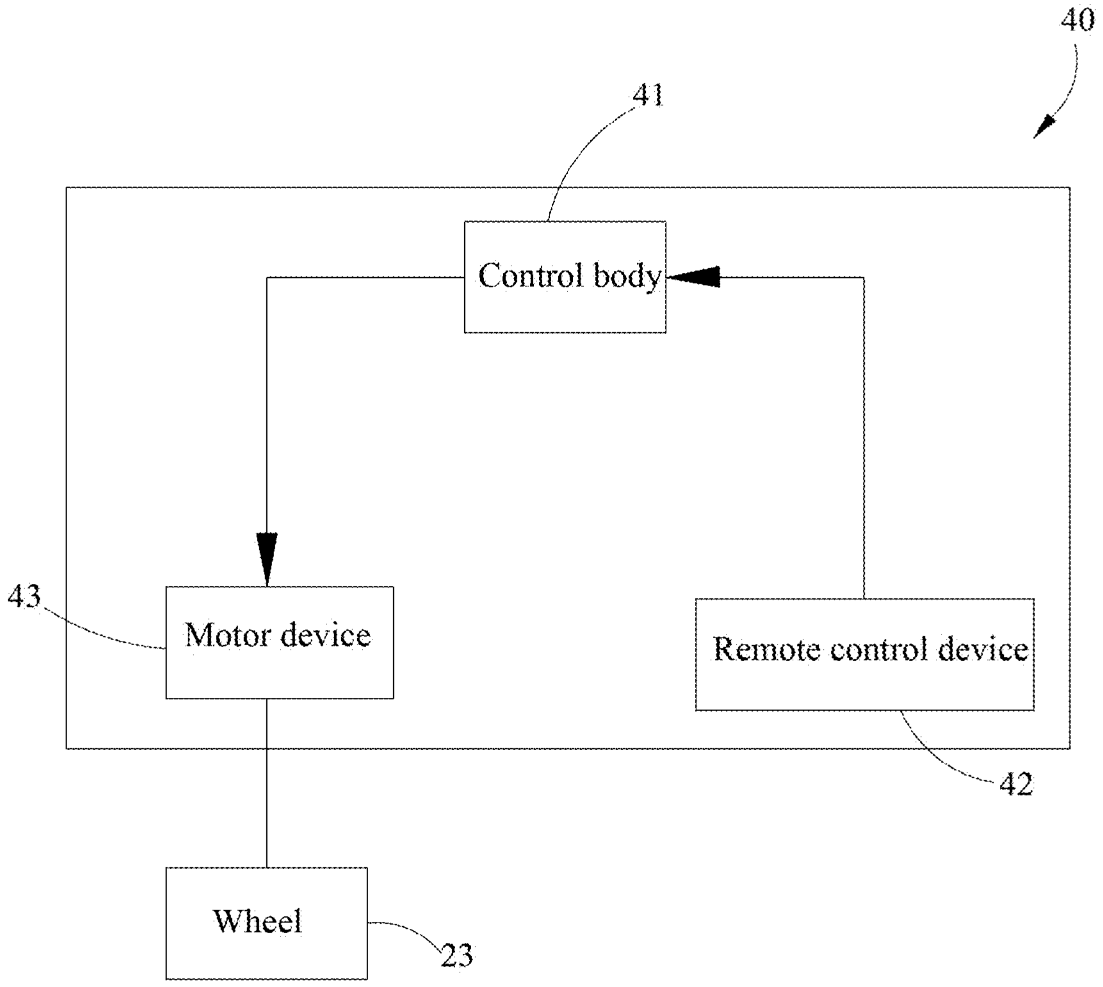
FIG. 3 is a system block diagram of a preferred embodiment of the present invention.

Reference is made to FIG. 3, the motor unit 40 comprises a control body 41, a remote control device 42, and a motor device 43. Preferably, the control body 41, the remote control device 42, and the motor device 43 are detachably disposed in the seating portion 10 or the support portion 20. The control body 41 receives a remote control signal from the remote control device 42 and converts the signal into a driving command for the motor device 43 to operate the motor device 43 and drive at least one of the wheels 23 in accordance with the remote control signal, thereby enabling the wheelchair to move forward, backward, stop, or turn in accordance with the remote control signal.

Wherein, the control body 41 can be connected to the remote control device 42 and the motor device 43 through wired or wireless connections for transmitting the remote control signal and the driving command.

For example, when the control body 41 is connected to the remote control device 42 and the motor device 43 through wired connections, multiple connection lines can be concealed within the frames of the seating portion 10, support portion 20, and handle portion 30. The control body 41 may also include a power supply module for supplying power to the remote control device 42 and the motor device 43.

Preferably, the control body 41 can be a part of the remote control device 42 and/or the motor device 43. The remote control device 42 can be in the form of buttons or joysticks provided on the operation handle 32. The remote control device 42 receives operation inputs and generates remote control signals to the control body 41. The motor device 43 is preferably provided between the two wheels 23 symmetrically disposed on the two lower support frames 21, to simultaneously drive at least one of the wheels on one side of the wheelchair.

In the expanded state of the wheelchair according to the present invention, a rider can sit on the seat cushion 12 of the seating portion 10, and an operator can stand on the base plate 211. In this way, the operator can operate the remote control device 42 to control the movement of the wheelchair. At the same time, the storage space C can accommodate luggage of the rider and/or the operator, thereby solving the problem of carrying luggage. Since the structural design of the improved wheelchair is simple, the size of the wheelchair, even in the expanded state, is not much different from that of a normal wheelchair, which facilitates mobility across floors.

In one embodiment, the remote control device 42 may also be configured on the seating handle 31 so that the rider can still independently control the operation of the wheelchair without the assistance of the operator.

Wherein, the control body 41 can only receive the remote control signal from one remote control device 42 to prevent interference from another remote control device 42 not set for that particular wheelchair.

Preferably, when the motor unit 40 is activated, the control body 41 can authenticate with the remote control device 42 through communication methods such as chips, passwords, or key exchange, to establish a dedicated signal channel between the control body 41 and the remote control device 42.

In one embodiment, another remote control device 42 may also be configured on the seating handle 31, allowing the rider to independently control the operation of the wheelchair.

Wherein, the remote control devices 42 provided on the operation handle 32 and the seating handle 31 can be a main remote control device and a secondary remote control device, respectively. The control body 41 can distinguish the remote control signals from the main remote control device and the secondary remote control device based on a preset weighting logic.

Furthermore, the main remote control device can be operated to set the weighting logic of the control body 41. In other words, the main remote control device can be operated to determine whether the control body 41 accepts the remote control signal from the secondary remote control device.

In the folded state of the improved wheelchair, not only is the overall volume greatly reduced, but the detachable design of the motor unit 40 also makes the wheelchair easy to store and facilitates a modular design. If some structures or devices are damaged, only the damaged parts need to be replaced, thereby avoiding material waste.

Furthermore, if only the motor unit 40 is removed from the wheelchair in the expanded state, the wheelchair can still be used as a regular wheelchair, suitable for temporary, short-distance, or quick service, while also avoiding the burden of the weight of the motor unit 40.

What is claimed is:

1. A wheelchair having a seating side and an operation side on opposite sides, comprising a seating portion provided above a support portion, a storage space formed between the seating portion and the support portion, and a handle portion provided on the seating portion on the operation side and connected to the seating portion or the support portion; wherein:

the seating portion comprises at least two seating frames, the at least two seating frames jointly forming a seat surface;

the support portion comprises at least two lower support frames, the at least two lower support frames jointly forming a storage surface, and the storage surface is spaced apart from the seat surface to form the storage space; at least two wheels are mounted under each of the at least two lower support frames, and the two lower support frames extend outwardly toward the operation side from the position of the handle portion to form an operation space;

at least two folding frames extend and connect between the seating portion and the support portion, and the sizes of the seat surface and the storage surface are adjustable by relative displacement between the two folding frames, the two lower support frames, and the two seating frames; and a detachable motor unit is provided on the seating portion, the support portion, and the handle portion, wherein the motor unit comprises a control body for receiving a remote control signal from a remote control device and converting the signal into a driving command for a motor device, and the motor device drives at least one of the wheels in accordance with the remote control signal.

2. The wheelchair according to claim 1, wherein at least a portion of the handle portion is provided in connection with the support portion, and the handle portion comprises an operation handle extending toward the operation space, and the remote control device is provided on the operation handle.

3. The wheelchair according to claim 2, wherein the handle portion comprises a seating handle extending toward the seating portion, and the remote control device is provided on the seating handle.

4. The wheelchair according to claim 1, wherein the remote control device is a main remote control device, the control body further receives a remote control signal from a secondary remote control device, and the control body distinguishes the remote control signals from the main remote control device and the secondary remote control device based on a preset weighting logic.

5. The wheelchair according to claim 4, wherein the main remote control device determines the weighting logic of the control body through operation.

6. The wheelchair according to claim 1, wherein one end of the two folding frames is optionally pivoted and connected to the seating portion or the support portion.

7. The wheelchair according to claim 6, wherein the two lower support frames each comprise at least one upper support frame extending in the upward to downward direction, and the other end of the folding frame is connected to the two lower support frames or the two upper support frames.

8. The wheelchair according to claim 7, wherein one end of the two folding frames is connected to the operation side of the two seating frames, and the other end of the two folding frames is connected to the two lower support frames or the two upper support frames.

9. The wheelchair according to claim 1, wherein a seat cushion is detachably placed on the seat surface, or the seat cushion folds or scales according to the change in size of the seat surface.

10. The wheelchair according to claim 1, wherein a base plate is disposed between the two lower support frames corresponding to the operation space, and two of the wheels are symmetrically mounted under each of the two lower support frames corresponding to the position of the operation space, with the motor device being provided between the two wheels.

11. The wheelchair according to claim 10, wherein the base plate is detachably disposed between the two lower support frames, or the base plate folds or scales according to the change in relative distance between the two lower support frames.

12. The wheelchair according to claim 1, wherein in an expanded state, the two lower support frames are configured in parallel with the two seating frames, and the two folding frames are arranged in a crosswise configuration; relative rotational displacement between the two folding frames changes the relative distance between the two lower support frames and the two seating frames, causing the seating portion and the support portion to move away from each other and transforming the wheelchair into a folded state.

13. The wheelchair according to claim 1, wherein in an expanded state, the two lower support frames and the two seating frames are arranged in a crosswise configuration, and the two folding frames are configured in a parallel manner; relative rotational displacement between the two lower support frames and the two seating frames changes the relative distance between the two folding frames, transforming the wheelchair into a folded state.

14. The wheelchair according to claim 4, wherein the wheelchair comprises two symmetrically arranged seating handles and two operation handles, and the remote control device is in the form of buttons or joysticks.

15. The wheelchair according to claim 1, wherein the control body comprises a power supply module for supplying power to the remote control device and the motor device.

16. The wheelchair according to claim 12, wherein the control body comprises a power supply module for supplying power to the remote control device and the motor device.

17. The wheelchair according to claim 13, wherein the control body comprises a power supply module for supplying power to the remote control device and the motor device.

18. The wheelchair according to claim 1, wherein the control body is a part of the remote control device and/or the motor device.

19. The wheelchair according to claim 10, wherein the control body is a part of the remote control device and/or the motor device.

20. The wheelchair according to claim 1, wherein at least a portion of the handle portion is provided in connection with the support portion, and the handle portion comprises an operation handle extending toward the operation space, and a seating handle extending toward the seating portion, wherein the remote control device is provided on the operation handle or the seating handle.

* * * * *